United States Patent [19]

Möller

[11] Patent Number: 5,133,000
[45] Date of Patent: Jul. 21, 1992

[54] ARRANGEMENT FOR SUPPORTING AND POSITIONING X-RAY CASSETTES IN RADIOGRAPHY

[76] Inventor: Anders Möller, Kullvägen 1, S-135 53 Tyresö, Sweden

[21] Appl. No.: 663,812

[22] PCT Filed: Sep. 8, 1989

[86] PCT No.: PCT/SE89/00478
§ 371 Date: Feb. 28, 1991
§ 102(e) Date: Feb. 28, 1991

[87] PCT Pub. No.: WO90/02972
PCT Pub. Date: Mar. 22, 1990

[30] Foreign Application Priority Data

Sep. 8, 1988 [SE] Sweden ................ 8803155

[51] Int. Cl.⁵ .................................. G03B 42/02
[52] U.S. Cl. .................................. 378/177; 378/179; 378/180; 378/181; 378/208
[58] Field of Search ............ 378/208, 209, 177, 181, 378/179, 180

[56] References Cited

U.S. PATENT DOCUMENTS

| | | | |
|---|---|---|---|
| 2,876,359 | 3/1959 | Plymale | 378/181 |
| 3,370,822 | 2/1968 | Miller | 378/181 |
| 3,705,984 | 12/1972 | Westenberger | 378/181 |
| 3,916,207 | 10/1975 | Reed | 378/177 |
| 4,414,683 | 11/1983 | Robinson | 378/177 |

Primary Examiner—Janice A. Howell
Assistant Examiner—Kim-Kwok Chu
Attorney, Agent, or Firm—Brooks & Kushman

[57] ABSTRACT

Arrangement for supporting and positioning X-ray cassettes (13) in the required position in radiography of patients confined to bed. The arrangement comprises at least one holder (10) and a lifting means (30). The holder (10) may be of different design, and in one preferred embodiment it comprises a base member (11) and a cassette support (12) extending upwardly therefrom, the base member (11) being supported by the bedstead bottom (15), and the X-ray cassette (13) being fixable standing on edge between the base member (11) and the cassette support (12). The lifting means (30) is adapted to be inserted between the bedstead bottom (15) and the mattress (14) in order to raise the latter, so that the X-ray cassette (13) is insertable in the space thus formed.

7 Claims, 5 Drawing Sheets

FIG._1
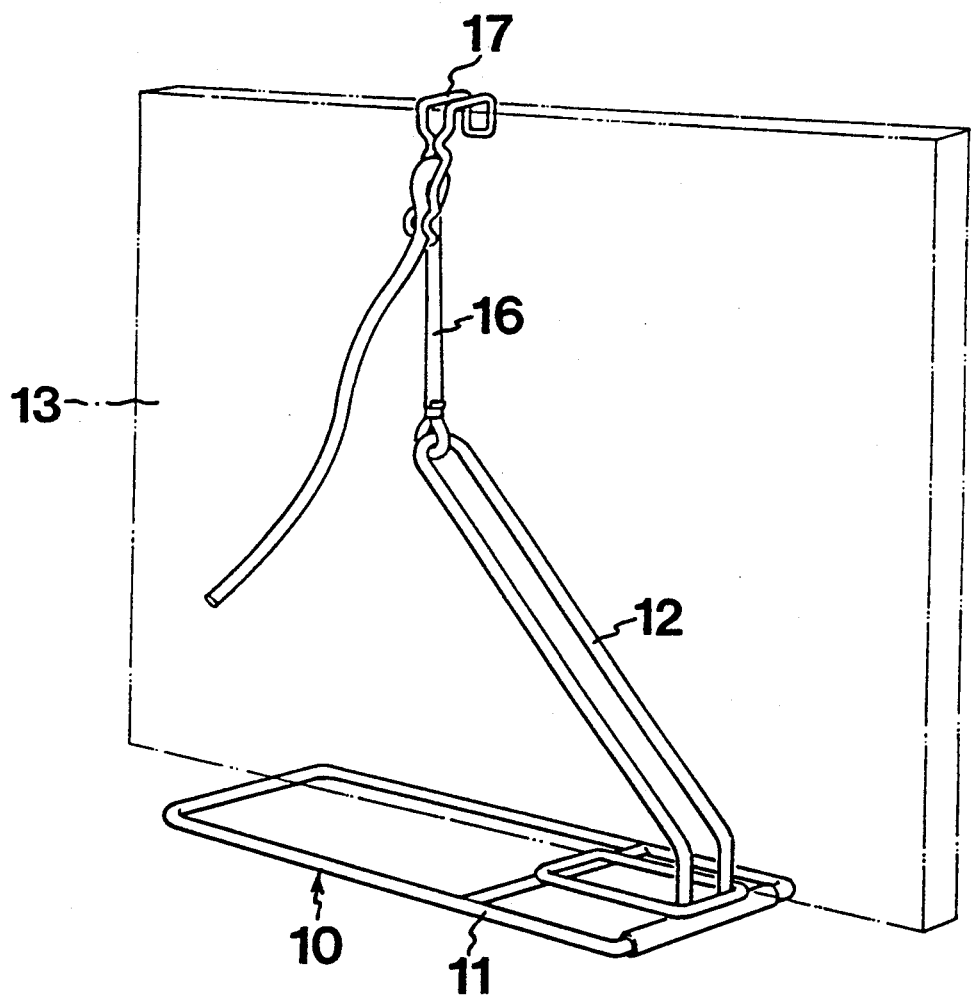

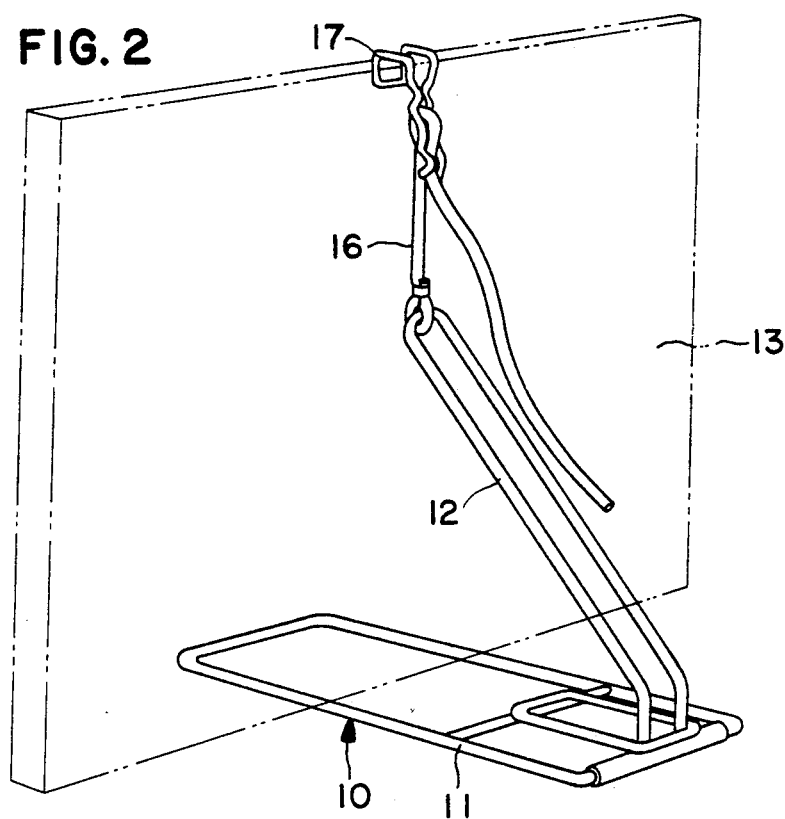
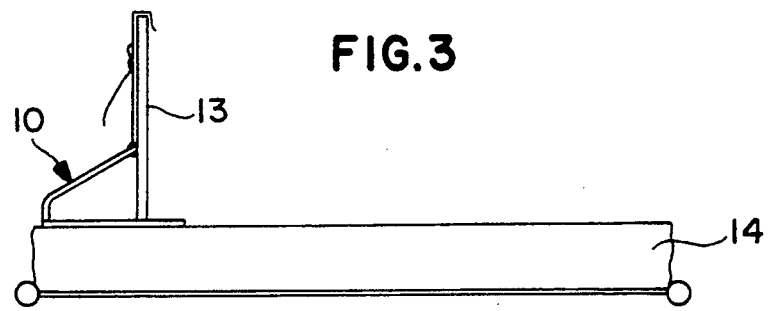
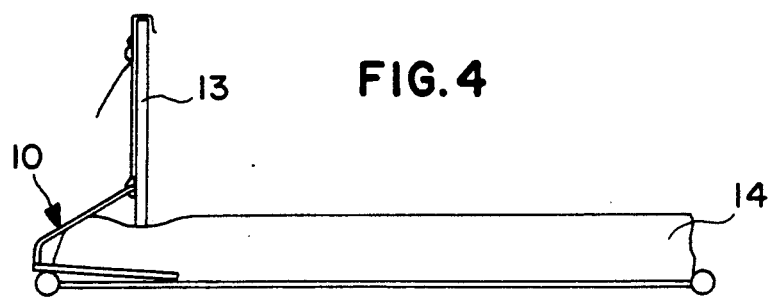

ARRANGEMENT FOR SUPPORTING AND POSITIONING X-RAY CASSETTES IN RADIOGRAPHY

CASSETTES IN RADIOGRAPHY

The present invention relates to an arrangement for supporting and positioning X-ray cassettes in the required position in radiography of patients confined to bed.

X-ray examination of an unconscious or seriously ill patient is a difficult and heavy task requiring the participation of several people. If, for example, the lungs are to be X-rayed, the patient first has to be lifted so that an X-ray cassette can be positioned under him. Then, the X-ray tubes of the mobile radiographic apparatus are positioned above the patient's chest and activated for a frontal picture, whereupon the patient is once again lifted, and the cassette is pulled out. In recent years, one has discovered that it is possible to facilitate this operation by positioning the cassette under the mattress, seeing that the mattress does not affect the picture quality to any appreciable extent, provided that the mattress is made of foam plastics or foam rubber. In most cases, the radiologist, in order to be able to make a correct diagnosis, also needs a side picture which may be even more difficult to take than the frontal picture. Since it is not possible simply to put the cassette next to the patient, which for example in pneumonography would mean that the back portion of the lung will not get into the picture because of the considerable divergence of the X-rays, the patient has to be lifted, which requires 4-5 people, and propped up with pillows. During this operation, one often has to be careful with life-sustaining flexible tubes and lines. The taking of side pictures is sometimes so difficult and risky for the patient, especially the cardiac infarction patient, that one has to refrain therefrom.

The object of the present invention is to provide an arrangement for facilitating all radiography of the above-mentioned type to such an extent that one person without effort can take all the necessary pictures without endangering the patient. This object is achieved by means of an arrangement comprising at least one holder with a base member and a cassette support extending upwardly therefrom, the base member being supported by the bedstead bottom, and the X-ray cassette being fixable standing on edge between the base member and the cassette support, and at least one lifting means adapted to be inserted between the bedstead bottom and a mattress thereon in order to raise the latter, so that an X-ray cassette is insertable in the space thus formed. The invention will be described in detail below, reference being had to the accompanying drawings showing an embodiment.

FIG. 1 is a perspective view of a holder and an X-ray cassette.

FIG. 2 is a view of the holder in FIG. 1, the cassette being shown in another position.

FIG. 3 illustrates the use of the holder in FIGS. 1 and 2 on a mattress or similar support.

FIG. 4 is a view similar to FIG. 3, the holder being placed on the mattress.

Figure 5:
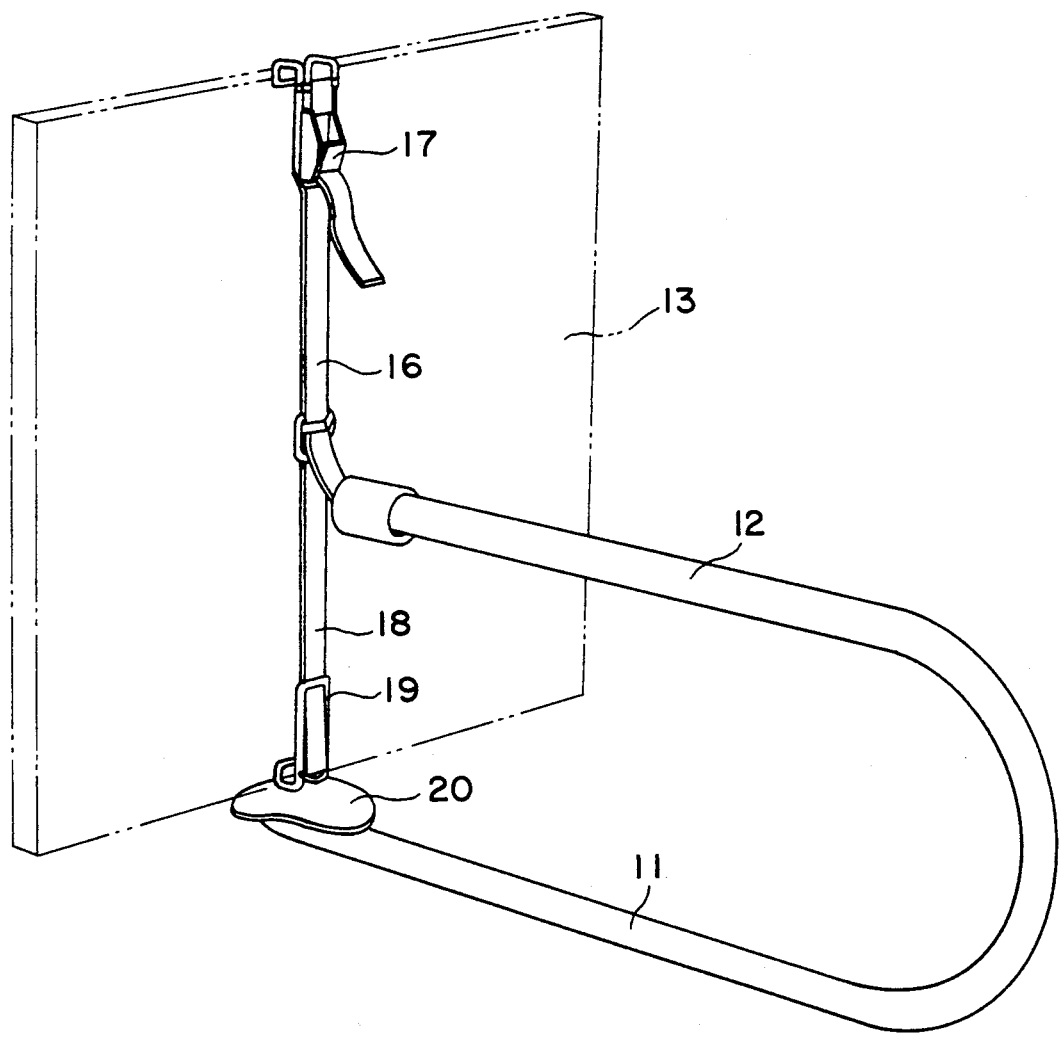
FIG. 5 is a view of another embodiment of the holder according to the invention.

FIG. 1 shows a cassette holder 10 forming part of the arrangement according to the invention, said holder having a base member 11 and a cassette support 12 extending upwardly therefrom. The base member 11 is in the form of a substantially rectangular wire frame, and the cassette support 12 is a double arm pivotably connected to one short side of the wire frame via a tubular member mounted thereon to which the double arm is welded. The cassette support 12 has at the end facing away from the base member 11 a resilient cord 16 with a hook 17 adjustably connected thereto. Said hook can be attached to the edge of the cassette 13 which, with the aid of the holder 10, can be positioned at different setting angles in relation to the wire frame 11. Two of these possible angles are shown in FIGS. 1 and 2.

When radiography is carried out, it is an advantage if the X-ray cassette can be positioned in different ways relative to the mattress. FIGS. 3 and 4 show the holder 10 and the cassette 13 in two different positions. In FIG. 3, the base member 11 is placed on top of the mattress, and in FIG. 4 it has been pushed under the mattress. Naturally, the holder 10 may also be positioned on, for example, a table.

FIG. 5 shows an alternative embodiment of the holder 10 according to the invention. In this embodiment, the portion of the cassette support 12 opposing the base member 11 extends over the base member 11 to which it is parallel. The base member 11 consists of a metal tube which is bent such that its other end forms the cassette support 12. The end of the cassette support is provided with straps 16, 18 and hooks 17, 19. The hooks can be attached each to one of the opposing edges of the X-ray cassette. One of these straps may be resilient. The end of the base member 11 opposing the cassette support 12 may be provided with a friction-reducing means 20, e.g. a plate with a teflon coating, to facilitate insertion of the base member 11 under the bedstead bottom.

Figure 6:
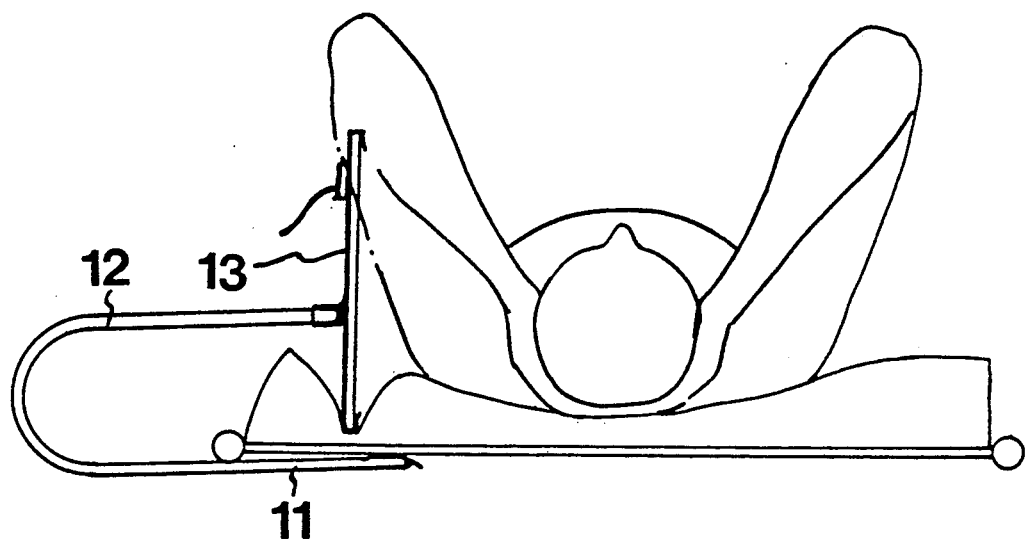
FIG. 6 illustrates the use of the holder in FIG. 5.

FIG. 6 shows the use of the holder in FIG. 5, the base member 11 being inserted under the bedstead bottom 15, and the cassette 13 being fixed standing on its edge, by means of the hooks 17 and 19. The lower edge of the cassette 13 has been pressed into the upper side of the mattress, and the base member 11 forms an abutment on the underside of the bedstead bottom so that the cassette is maintained securely in its place.

Figure 7:
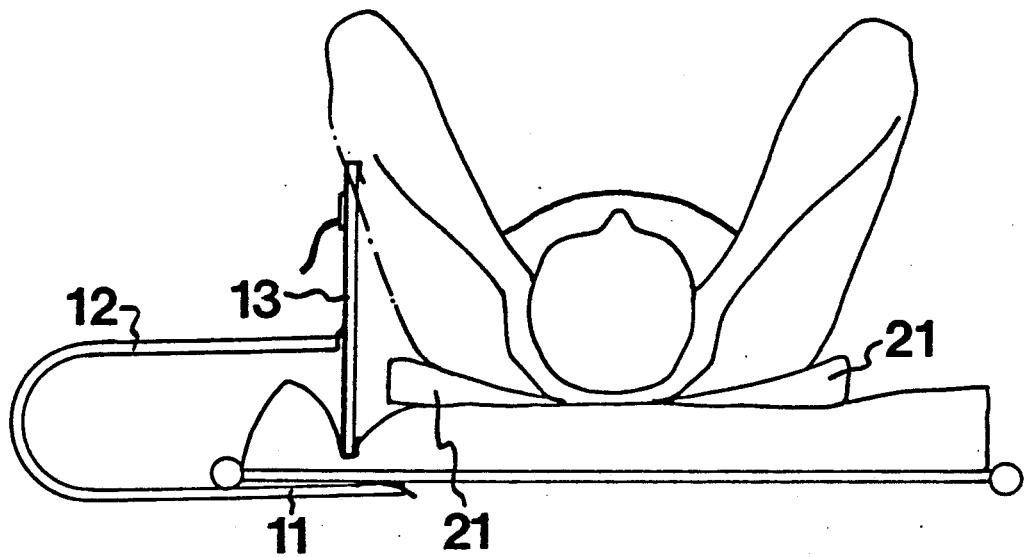
FIG. 7 is a view similar to FIG. 6, illustrating the use of the holder in FIG. 5 together with supporting pillows.

FIG. 7 is a view similar to FIG. 6, but here the patient has been propped up with pillows 21.

Figure 8:
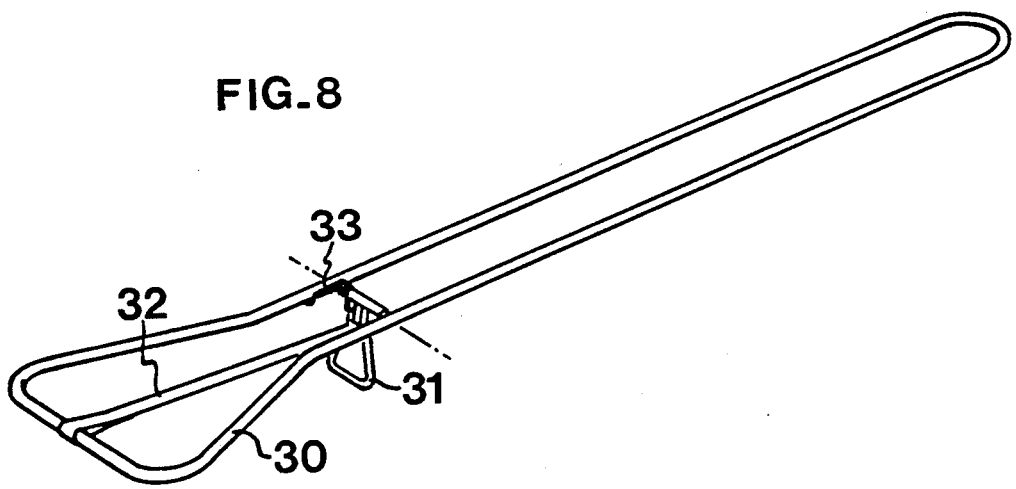
FIG. 8 is a view of a lifting means included in the arrangement according to the invention.

FIG. 8 shows a lifting means 30 adapted to be inserted between the bedstead bottom 15 and the mattress 14 in order to raise the latter so that the X-ray cassette 13 can be inserted in the space therebetween. The lifting means 30 is bow-shaped and formed at one end with a handle. Near the handle a pivotable supporting means 31 is provided which unfolds automatically to engage the bedstead bottom 15 when the handle is raised, in order to maintain one side of the mattress 14 at a distance from the bedstead bottom for insertion of the cassette 13. The supporting means 31 is spring-loaded at 33 to the unfolded position substantially perpendicular to the lifting means, and is adapted to be pulled to a folded position along said lifting means by a strap 32 attached to the handle end. The portion of the lifting means 30 to be inserted under the mattress, i.e. the portion of the lifting means 30 shown to the right of the supporting means 31 in FIG. 8, is not longer than the width of the bed. Preferably, this portion of the lifting means 30 is made of a material, e.g. carbon fibre reinforced plastics, which is pervious to X-rays. This portion may also be covered by a cloth or a foil sheet. The lifting means may also consist of a plastics sheet.

Figure 9:
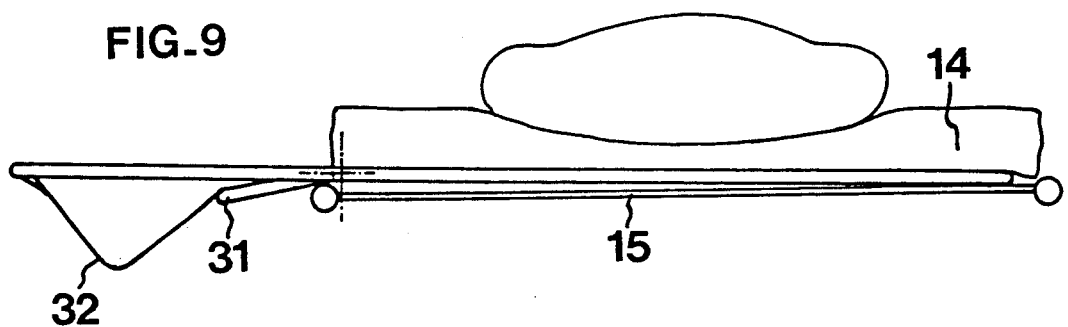
FIG. 9 illustrates the insertion of the lifting means under the mattress.
Figure 10:
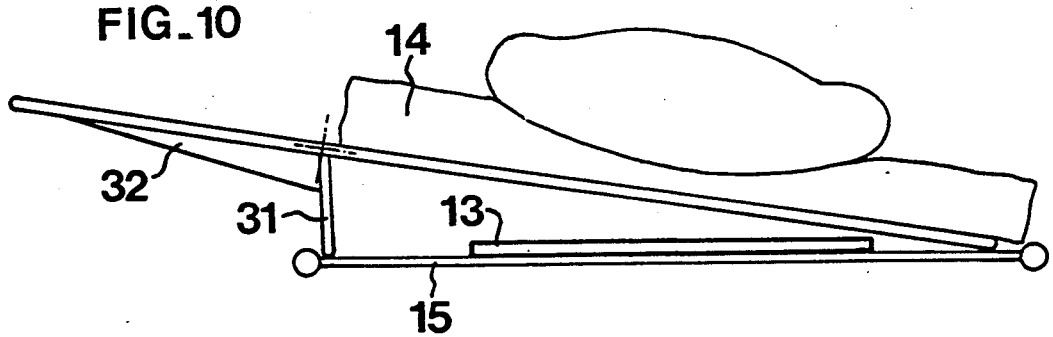
FIG. 10 illustrates the use of the lifting means when an X-ray cassette is placed under the mattress.

FIGS. 9 and 10 show the use of the lifting means 30. Said means is inserted between the mattress 14 and the bedstead bottom 15, the supporting means 31 folding backwards. When the lifting means 30 thereafter is raised, the supporting means 31 is unfolded because of the spring-loading 33, as shown in FIG. 10, so that the lifting means 30 can be positioned inclined on the bedstead bottom 15, whereupon the X-ray cassette 13 can easily be placed between the mattress 14 and the bedstead bottom 15.

In order to put down the mattress on the bedstead bottom 15 again, one raises the lifting means 30 and gives a pull on the strap 32 so that the supporting means 31 is folded to a position along the lifting means which can now be put down on the bedstead bottom 15. It is now possible to remove the lifting means 30 before radiography, which, however, is not necessary if the portion to the right of the spring-loading 33 is made of an X-ray pervious material, and it is also possible to maintain the lifting means in the inclined position during the radiography, provided that this does not affect the desired result. Furthermore, it is possible to use two lifting means, one on each side of the cassette.

Thus, the invention provides an extremely simple radiography aid which easily can be handled by one single person without endangering the patient. The invention may naturally be modified in many ways with regard to the design of the holder 10, as well as the lifting means 30.

The device is adpted to be carried in a separate, easily portable bag containing a desired number of holders of different types, and lifting means.

I claim:

1. An arrangement for supporting and positioning X-ray cassettes (13) in a required position in radiography of patients confined to bed having a bedstead, comprising at least one holder (10) with a base member (11) adapted to be supported by the bedstead bottom (15), and a cassette support (12) extending upwardly from said base member; characterised in that the X-ray cassette (13) is fixable standing on edge between the base member (11) and the cassette support (12), wherein the cassette support (12) of the holder (10) at the end facing away from the base member, has at least one cord or strap (16) to which a hook (17) can be attached to the edge of the cassette (13), is adjustably connected.

2. An arrangement for supporting and positioning X-ray cassettes (13) in a required position in radiography of patients confined to bed, having a bedstead comprising at least one holder (10) with a base member (11) adapted to be supported by the bedstead bottom (15), and a cassette support (12) extending upwardly from said base member characterised in that the X-ray cassette (13) is fixable standing on edge between the base member (11) and the cassette support (12), and further characterised in that the base member (11) of the holder (10) is in the form of a wire frame and the cassette support (12) is a double arm connected thereto.

3. An arrangement as claimed in claim 1, characterised in that the portion of the cassette support (12) opposing the base member (11) extends over the base member (11) to which it is parallel, and that the end of the cassette support (12) has cords or straps (16, 18) with hooks (17, 19) adapted to be attached to opposing edges of an X-ray cassette.

4. An arrangement as claimed in claim 1, characterised in that the at least one cord or strap (16, 18) of the cassette support is resilient.

5. An arrangement for supporting and positioning X-ray cassettes (13) in a required position in radiography of patients confined to bed, having a bedstead comprising at least one holder (10) with a base member (11) adapted to be supported by the bedstead bottom (15), and a cassette support (12) extending upwardly from said base member; and lifting means (30) characterised in that the X-ray cassette (13) is fixable standing on edge between the base member (11) and the cassette support (12), and further characterised in that the lifting means (30) is plate-shaped or bow-shaped and has, near one end which in use is outwardly directed, a pivotable supporting means (31) adapted to be unfolded to engage the bedstead bottom (15), so as to maintain the mattress (14) at a distance therefrom when the cassette (13) is inserted.

6. An arrangement as claimed in claim 5, characterised in that the supporting means (31) is spring-loaded (at 33) to an unfolded position substantially perpendicular to the bow or plate, and is adapted to be pulled to a folded position along the bow or plate by means of a strap.

7. An arrangement as claimed in claim 1 further comprising lifting means wherein said lifting means is adapted to be inserted between the bedstead bottom (15) and a mattress (14) thereon in order to raise the later, so that an X-ray cassette (13) is insertable in the space thus formed.

* * * * *